Oct. 9, 1951 D. H. RANSOM 2,570,274

ELECTRON BEAM SWITCHING TUBE AND SYSTEM

Filed March 14, 1946 5 Sheets-Sheet 1

INVENTOR.
DAVID H. RANSOM

BY

ATTORNEY

Oct. 9, 1951 D. H. RANSOM 2,570,274

ELECTRON BEAM SWITCHING TUBE AND SYSTEM

Filed March 14, 1946 5 Sheets-Sheet 2

INVENTOR.
DAVID H. RANSOM

BY

ATTORNEY

Oct. 9, 1951 D. H. RANSOM 2,570,274

ELECTRON BEAM SWITCHING TUBE AND SYSTEM

Filed March 14, 1946 5 Sheets-Sheet 3

INVENTOR.
DAVID H. RANSOM

BY

ATTORNEY

Oct. 9, 1951 D. H. RANSOM 2,570,274

ELECTRON BEAM SWITCHING TUBE AND SYSTEM

Filed March 14, 1946 5 Sheets-Sheet 4

INVENTOR.
DAVID H. RANSOM

BY

R. P. Morris
ATTORNEY

ELECTRON BEAM SWITCHING TUBE AND SYSTEM

Filed March 14, 1946 5 Sheets-Sheet 5

INVENTOR.
DAVID H. RANSOM

BY

R.J. Morris
ATTORNEY

Patented Oct. 9, 1951 2,570,274

UNITED STATES PATENT OFFICE 2,570,274

ELECTRON BEAM SWITCHING TUBE AND SYSTEM

David H. Ransom, Montclair, N. J., assignor, by mesne assignments, to International Standard Electric Corporation, New York, N. Y., a corporation of Delaware Application March 14, 1946, Serial No. 654,271

15 Claims. (Cl. 179—18)

This invention relates to new and useful improvements in electronic switching.

The object of the present invention is an electronic switching device and system which lend themselves to stepwise setting such as is required in circuit controllers similar to those employed in telephone exchange register controlling and the like.

Figure 5:
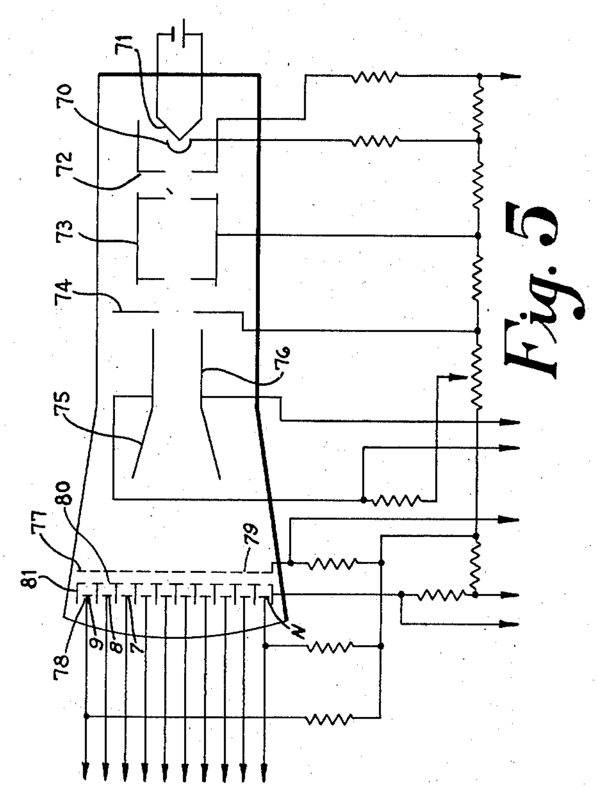
Figure 7:
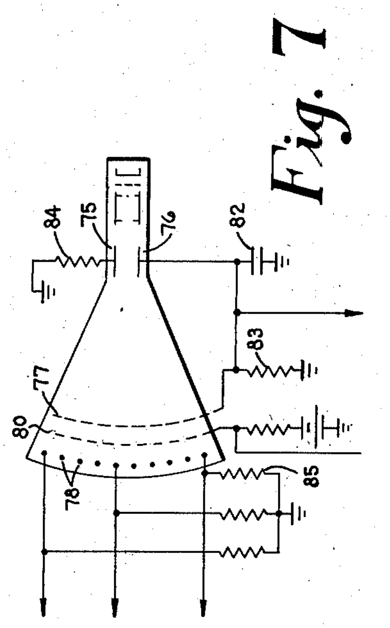
Figure 6:
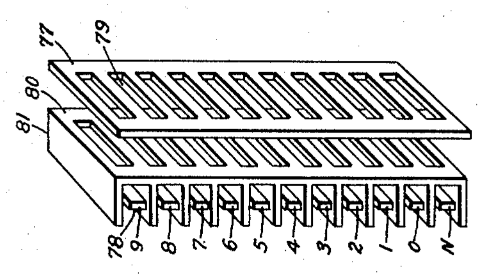

A few embodiments of the invention will be explained in connection with the drawings in which Figs. 1–4 diagrammatically illustrate the pertinent parts of a telephone system of the type disclosed in my copending applications;

Figs. 5 and 7 diagrammatically illustrate two simple embodiments of the invention in any switching system; and Fig. 6 is a plan view of the screen used in the device.

Figures 1, 1A:
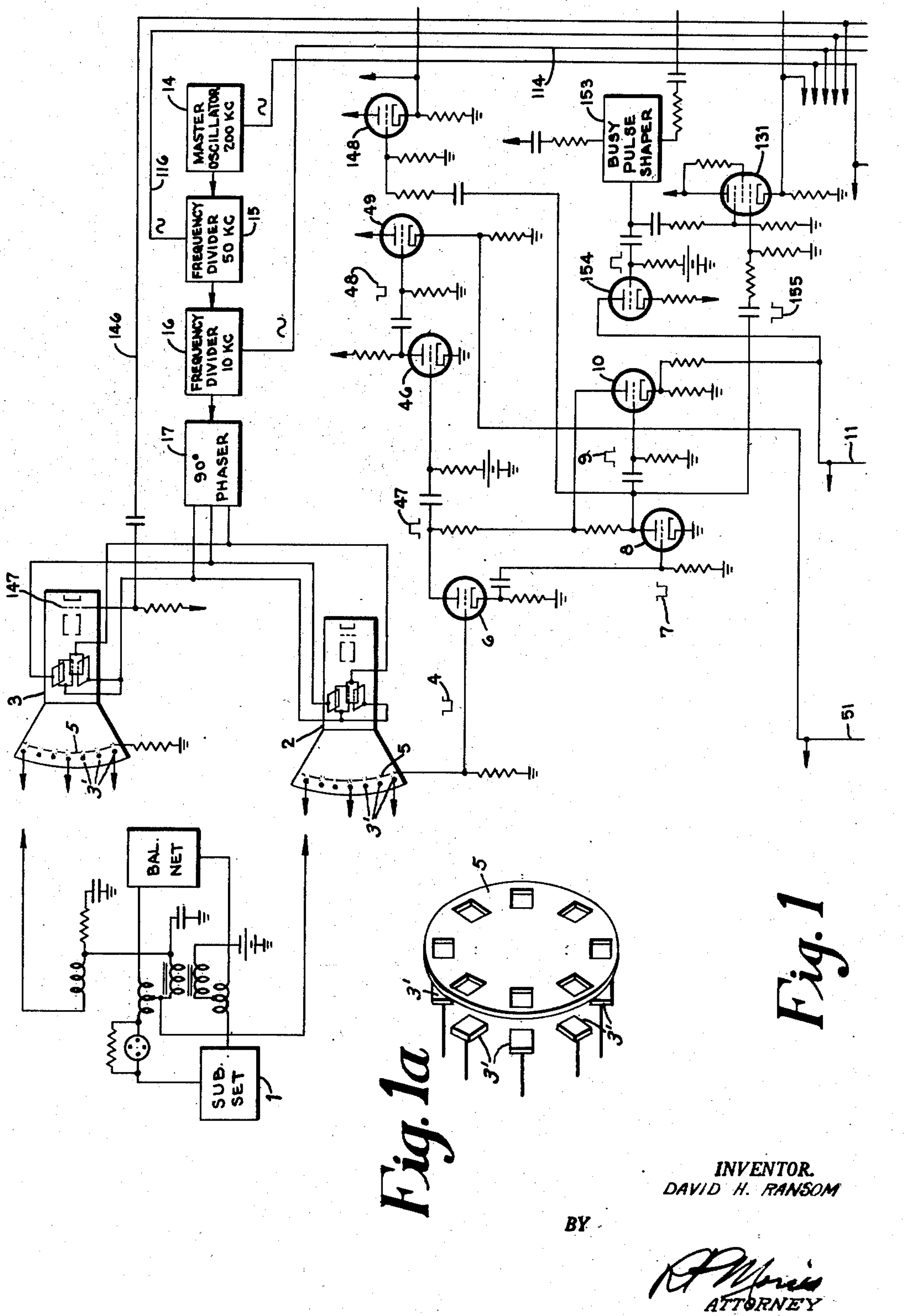

When the subscriber at substation 1 initiates a call and removes his receiver from the switch hook, a negative potential is placed on the dynode in which the line terminates in the receiving and sending distributors 2 and 3. The distributors are cathode ray tubes provided with the customary electron guns, and horizontal and vertical deflecting means for continuously rotating the electron beam over the dynodes 3′ (Figs. 1 and 1*a*). Whenever the electron beam of the receiving tube 2 sweeps over the dynode of the calling line, a negative pulse 4 will be fed from the anode 5 of the receiving tube 2 to the grid of cathode follower and inverter 6. The cathode output 7 of tube 6 is fed to the grid of a clipper amplifier 8. Tube 8 is normally biased to draw current, and its signal amplitude is adjusted so that each negative pulse 7 will drive it beyond cut-off whereby transmitter and dial modulations will be clipped off.

The positive pulses 9 appearing in the plate output of tube 8 are fed to a cathode follower 10 and thence over conductor 11 to all the line finder gate tubes 12 whose grids are multipled to conductor 11. The line finder gate tubes 12 are normally biased far enough beyond cut-off so that the signal 13 applied to its control grid will not affect the plate output.

The deflecting means of the distributors 2 and 3 are operated in parallel from a master oscillator 14 through a 50-kc. frequency divider 15, a 10-kc. frequency divider 16, and a 90° phase shifting network 17 to produce the rotation of the beams at 10 kc. A lock-in oscillator 18 in the line finder circuit operates at a frequency less than the 200 kc. of the master oscillator 14, and divides this to a frequency of approximately 50 kc. The sine wave output 19 of oscillator 18 is passed through a clipping amplifier and differentiating circuit 20. The sharp positive pulses 21 in the output of circuit 20 are applied to a multi-vibrator 22 arranged to synchronize at approximately 10 kc. The square pulses 23 appearing in the output of the multi-vibrator 22 are differentiated in a network 24 and applied in the form 25 to the grid of a clipper gate tube 26.

The constants and bias of the clipper gate 26 are adjusted to form in the output a short negative square pulse 27 of approximately five microseconds duration from the leading edge of the differentiated pulse 25 and to suppress the trailing edge thereof. The pulse 27 is passed through a cathode follower 28 to the cathode of the line finder gate 12. The amplitude of the pulse 27 is adjusted by a delayed gain tube 29 so that normally the line finder gate 12 remains cut-off. Neither the negative pulse 30 applied singly to the cathode nor the positive pulse 13 applied singly to the grid of the line finder gate 12 will drive it beyond cut-off to conduction. The frequency of the line finder lock-in oscillator 18 being slightly less than that of the master oscillator 14, the pulses 13 and 30 will drift in time until they occur simultaneously whereupon a negative pulse 31 will be produced in the output circuit of the line finder gate 12. This pulse is applied through a rectifier 32 and an integrating network 33 to the grid of a gate control tube 34. The gate control tube 34 will be driven to cut-off after a few pulses which will permit a lock-in gate tube 35 to operate and pass a signal from the master oscillator 14 to the lock-in oscillator 18 to synchronize the latter. A phase corrector network 36 is provided between 35 and 18 for insuring accurate adjustments.

A portion of the output of rectifier 32 is fed to the grid of delayed gain tube 29 to drive it beyond cut-off after a few pulses and this, in turn, makes the release tube 37 conductive. Plate resistor 38 of the delayed gain tube 29 is connected with the screen grid of the clipper gate 26, causing the screen voltage to rise to increase the amplitude of pulse 27 and of the resulting pedestal pulse 30 which is applied to the cathode of line finder gate 12. The grid of the line finder gate will, therefore, be driven positive by the incoming pulse 13, thus producing clipping by the grid current. The signal amplitude of the incoming pulse 13 is reduced to such a value as not to affect any other link.

The negative plate output pulses 31 of the line finder gate are applied also to the grid of input gate control tube 39 which, together with output gate control tube 40, control the input gates 41, 42 and the output gates 43, 44. The gate tubes 41 and 44 are normally biased to cut-off on their suppressor grids by the voltage drop in the plate resistor 45 of the input gate control 39. When the negative pulse 31 drives the grid of 39 beyond cut-off, the voltage drop across resistor 45 is reduced to zero. This will raise the bias on the suppressor grids of 41 and 44, and permits signals on the control grids of these tubes to pass.

Let us assume that speech and dial pulses will modulate a line signal at twenty-five percent. The clipping action of tube 8 will cut-off the modulated portion of the pulse so that the signals 13 applied to the line finder gate will be uniform. A clipper tube 46 (Fig. 1) is biased so that only the modulated portion of the pulses 47 appearing in the output of the inverter 6 will be transmitted by it as negative pulses 48 to the grid of a cathode follower 49. The cathode output 50 of 49 is fed over conductor 51 to the input gates 41 and 42 of all the links.

Figure 4:
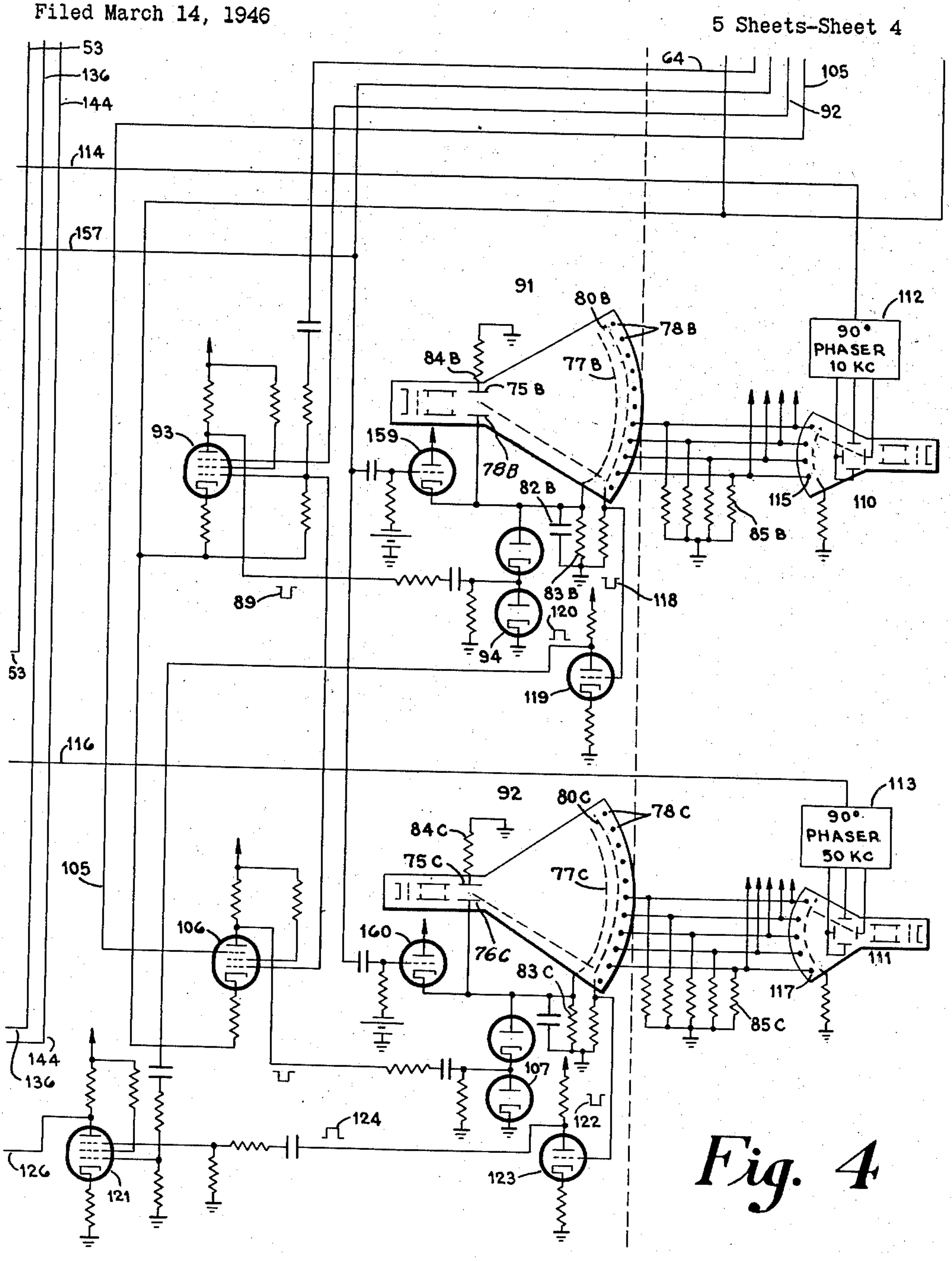

Normally a series of negative pulses 50 will be passed by the input gate 41 as positive pulses 52 over conductor 53 to an integrating network 54 and therethrough to an amplifier tube 55 of the dial pulse circuit (Fig. 3) before dialing starts at the calling subscriber's station. The selective action of the input clipper tube 46 interrupts these pulses with each dial pulse. The integrating network 54 functions as a low pass filter and forms the pulses 52 into low frequency pulses which are amplified by 55 and passed as negative pulses 56 to the grid of a clipper amplifier 57 which forms them into square positive pulses 58. These are differentiated in a network 59 into pulses 60 which are fed to the grid of dial pulse generator 61 forming together with triode 62 a flip-flop circuit. Whenever the positive part of pulse 60 is received on the grid of 61 the latter becomes conductive for a period determined by the time constants of the circuit, and a positive pulse 63 is sent over conductor 64 to the digit gate tubes (Fig. 4). These tubes and the dial pulse responsive equipment of Fig. 3 control electronic switching devices which will now be explained with the aid of Figs. 5–7.

The device has a cathode 70 heated by a filament 71 to emit electrons towards a grid 72. The electrons passing through the grid 72 are formed into a beam by anodes 73, 74. In order not to restrict the electron flow and to form a ribbon-shaped beam, the electron lens structure 72, 73, 74 is preferably of cylindrical shape. Two plates 75, 76 provided above and below the electron beam passing through the aperture of the anode 74 will, when suitable potentials are applied to them, deflect the beam to pass through any one of the openings 79 provided in a screen 77 and impinge on dynodes 78 in which conductors terminate over which certain controls are effected.

Fig. 6 illustrates a plan view of screen 77 showing the cut-outs 79 through which the beam can reach the various dynodes 78 numbered, from the top down, 9 to 0, and the lowermost one "N" on which the beam normally rests.

Secondary electrons produced by the dynode 78, on which the beam impinges, will be collected on an anode 80. This anode is maintained at a positive potential with respect to the dynodes, and its extensions 81 are arranged to act as shields between the dynodes. The potential applied to the screen electrode 77 is such as to position the electron beam on a desired dynode 78 and hold it there.

The grid 72 may be used to modulate the beam, thus to control the current in the dynodes 78 and the anode 80. The potential applied to the dynodes 78 may be used to modulate the anode current and, conversely, the potential applied to the anode 80 may be used to modulate the dynode current.

The beam may be normally directed at the lowermost dynode "N" either by the initial positioning of the electron gun or by applying a suitable potential to the deflecting plates 75, 76.

Fig. 7 illustrates a simple circuit in which the electronic switch may be used. In this embodiment the screen 77 and deflecting plate 76 are grounded in parallel over a condenser 82 and a resistance 83. The deflecting plate 75 is connected over a resistance 84 to ground. When the condenser 82 is charged to a potential sufficient to deflect the beam to some opening, say, to the opening #5 in screen 77, then the beam will remain so positioned. Resistance 83 will permit the charge to leak off condenser 82 until the beam strikes the edge of the screen opening. The electrons collected by the screen 77 will balance the current flow through resistance 83 and stop the motion of the beam. The current flow induced by the beam in the dynode 78 aligned with screen opening #5 may be used to control any suitable load such as a relay or vacuum tube indicated by resistances 85.

The circuit is restored to normal by discharging condenser 82 by any suitable switching operation.

It will be seen, therefore, that the dynode may function in the same manner as a multi-point electromechanical switch whose wipers are moved from terminal to terminal.

The dynode may be operated also to count pulses which are assumed to place a sufficient charge on condenser 82 to move the beam by one opening 79 in screen 77. At the end of a series of pulses the beam will be positioned as in the previously assumed case. Current flow in the dynodes 78 may be suppressed during pulsing by negatively biasing the anode 80.

It will be seen, therefore, that the switch can be used to respond to dial pulses and that it may also be operated in a revertive impulse system to control selectors, by reducing the charge on condenser 82 during the movement of the selector. Many other modifications are possible in the construction of the tube and the circuits.

Three beam switching tubes of the above described character are used in the present circuit. One of these, 90, is associated wtih the dial pulse circuit in Fig. 3 and functions to control in the first, second, third and fourth positions of its beam the dialing of the first and second digits, the testing of the called line, and the ringing. The second switching tube 91 (Fig. 4) performs the function of a group or tens digit register, and the third tube 92 functions as a units register.

Whenever possible, the elements of tubes 90, 91, 92 will be identified by the reference numerals used in Figs. 5–7 with a suitable suffix to distinguish the tubes from one another. The elements of tube 90 will have the suffix "*a*," those of 91 the suffix "*b*," and those of tube 92 the suffix "*c*."

In all three switching tubes the beam is normally centered on the No. 1 dynode whereby a positive potential is applied from the No. 1 dynode 78 of tube 90 over conductor 92 to the suppressor grid of group digit gate tube 93.

The first series of pulses that the calling subscriber dials will produce positive pulses 63 in the output circuit of tube 62 which will be applied over conductor 64 to the control grid of the group digit gate 93 and in multiple therewith to the control grid of the units digit gate 106. The latter cannot function at this time. When the tube 93 is made operative by the potential applied to its suppressor grid over conductor 92 in the first position of switching tube 90, negative pulses 89 will be applied from its plate to a combination rectifier and limiter tube 94. These pulses will charge the condenser 82b connected between ground and the deflecting plate 76b of the group digit switching tube 91. Each charge applied to the condenser will advance the beam of 91 by one step. Whenever the beam reaches a dynode opening (79, Fig. 6), the charge will leak off the condenser 82b over resistance 83b, permitting the beam to move to the edge of the opening, whereupon equilibrium is established between the beam current and the leakage current.

In the example illustrated in the drawings, it is assumed that twenty lines, divided into four groups of five, terminate in the distributors 2 and 3. Depending on the group to which the called line belongs, the beam of switch 91, will be moved onto the first, second, third or fourth dynode.

Upon the completion of the sending of the first set of pulses, which in the present case are assumed to represent the group or tens digit of the called number, the beam of switching tube 90 is moved over to the second dynode in the following manner:

The positive pulses 58 formed by the dial pulses in the output circuit of amplifier 57 are passed through an integrating network 95 to the grid of digit pulse generator 96 which forms a flip-flop circuit with tube 97. The integrated dial pulses cause tube 96 to conduct for the duration of the series of pulses representing the first or group digit and to generate a negative pulse 98 which is differentiated in network 99 and applied as a pulse 100 to the grid of transfer pulse generator tube 101. This tube is paired with a triode 102 to form a flip-flop circuit in which the latter is normally conducting. At the end of the first series of pulses, 101 becomes conducting for a period determined by the circuit constants, and generates a negative pulse 103 which is fed to a combination rectifier and limiter 104 controlling the stepping of the beam of tube 90 in the same manner as 94 controls the beam of tube 91.

When the beam of tube 90 is centered on dynode No. 2, a positive potential is applied over conductor 105 to the suppressor grid of units digit gate 106. Since, as above stated, the control grid of this gate is connected in multiple with the control grid of group digit gate 93, it will receive over conductor 64 the positive pulses 63 appearing in the plate circuit of the dial pulse generator 62 during the dialing of the second or units digit. The negative pulses produced in the plate circuit of 106 will be applied to the rectifier and limiter 107, which will control the stepping of the beam of units digit register tube 92 in accordance with the dial pulses in the same manner as limiter 94 controls the stepping of the beam of register 91.

The unit digit register 92 has five positions corresponding to the five lines in each of the four groups.

Figure 2:
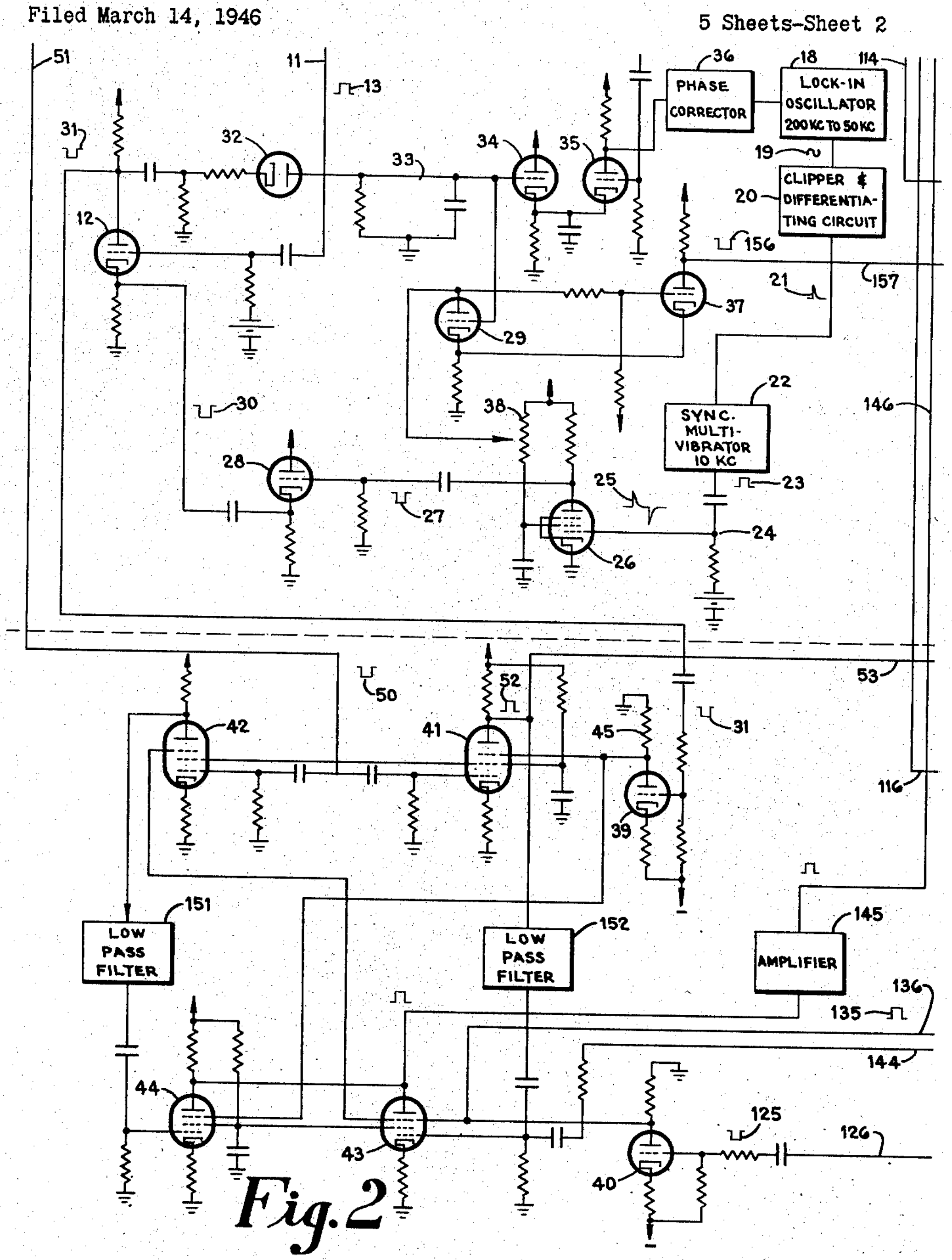
Figure 3:
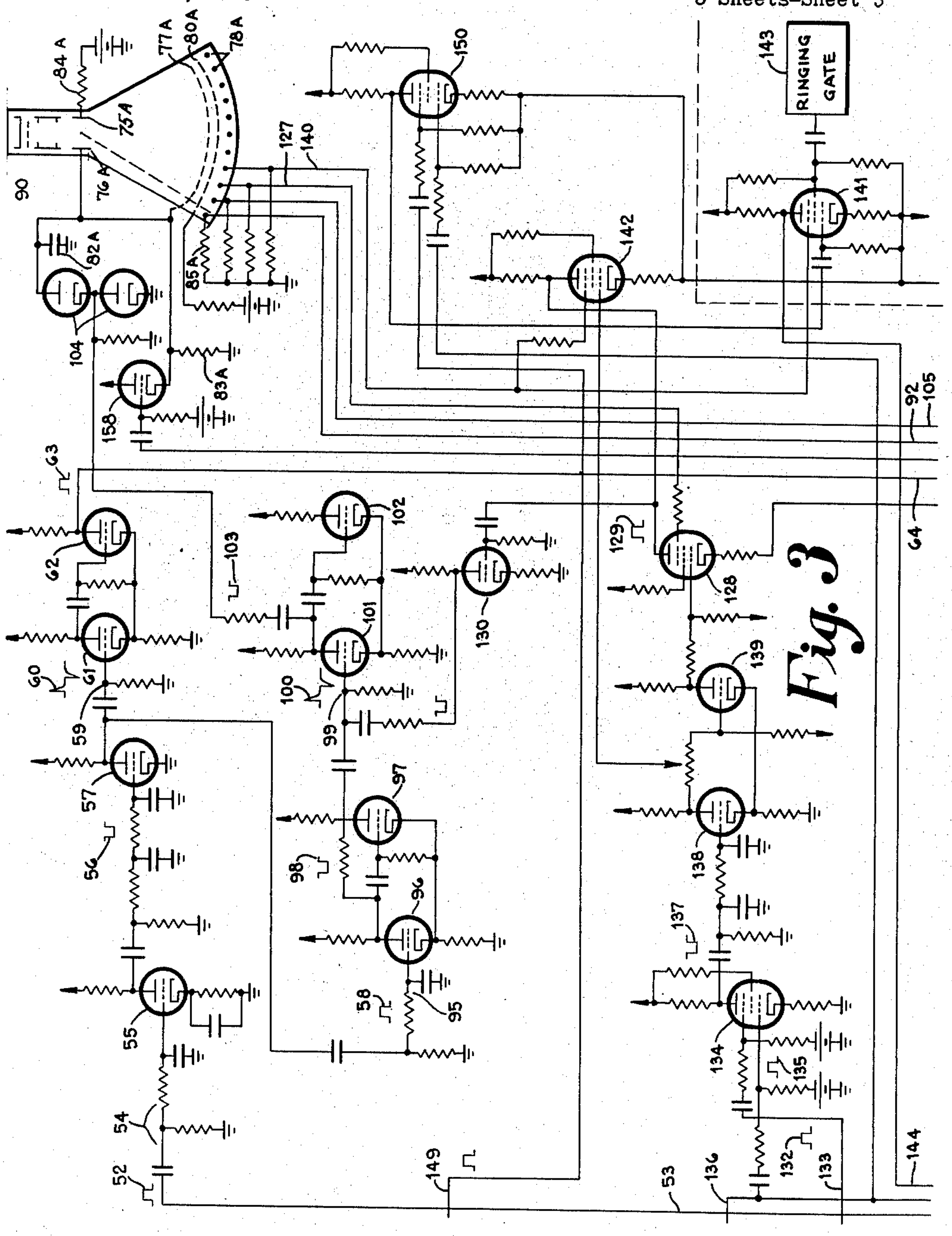

The setting of register tubes 91 and 92 will be in accordance with the group and units designations of the called line. It will be clear from the drawing that there is one dial pulse equipment (Fig. 3) and one register (Fig. 4) associated with each line finder and talking circuit link (Fig. 2). The dynodes of the register tube 91 associated with each link are multipled to terminals constituting the dynodes of a cathode ray tube 110. Similarly, the dynodes of the register tube 92 associated with each link are multipled to a set of terminals constituting dynodes 117 of a second cathode ray tube 111.

After the dialing of the units pulses the digit pulse generator 96 and 97 again operates, causing the transfer pulse generator 101, 102 to apply a timing pulse 103 over the limiter 104 to move the beam of switching tube 90 into position 3.

The dialing operation is now completed and pulses will be generated in accordance with the setting of the group and units digit registers 91 and 92 to identify the called line.

The group identifying pulses are generated by the cathode ray tube 110 and those identifying the units digit of the called line by the cathode ray tube 111, these tubes being of substantially the same type as tubes 2 and 3.

A 10 kc. phaser 112 is connected over a conductor 114 with the 10 kc. frequency divider 16. The beam of tube 110 will, therefore, be rotated at the same speed as the beams of the sending and receiving tubes 2 and 3. However, the four dynodes 115 of tube 110 are so shaped that each is contacted during an interval corresponding to the time required for the beams of tubes 2 and 3 to sweep over five dynodes.

The units digit tube 111 has a 90° phaser 113 which is driven over conductor 116 by the frequency divider 15 at 50 kc. causing the beam of tube 111 to travel five times as fast as the beam of tube 110 so that it will contact all the five dynodes 117 provided therein while the beam of 110 travels over one dynode 115.

The pulses generated by the beams of 110 and 111 sweeping over their dynodes are fed to the corresponding dynodes 78b, 78c of the group and units digit registers 91 and 92. However, pulses will be transferred to the anodes 80b and 80c of the register tubes only through the dynodes 78b, 78c on which the beams of the register tubes are set. The pulse received on the anode 80b of 91 represents the group time of the called line. It will appear as 118 on the grid of an inverter 119, whenever the beam of tube 3 sweeps over the group of dynodes to which the called line belongs. The positive pulse 120 appearing in the plate of inverter 119 is applied to the control grid of a pulse gate tube 121.

In the same manner a negative pulse 122 is fed from the anode 80c of the unit digit tube 92 to the control grid of an inverter 123 whenever the beam of tube 3 sweeps over the dynodes individual to the called line. This will produce positive pulses 124 on the suppressor grid of the pulse gate tube 121. The output 125 of the gate 121 which is applied over conductor 126 to the control grid of the output gate control 40 represents, therefore, the time position of the called line in the distributors 2 and 3.

The switching control tube 90 has now its beam positioned on the third dynode, applying a biasing potential over conductor 127 to the suppressor grid of busy test gate tube 128 to make this tube conducting. If the called line is idle, then a single positive pulse 129 is fed from the plate of 128 to the control grid of an inverter tube 130 which will operate the transfer pulse generator 101, 102 in the same manner as it was operated by the digit pulse generator to advance the switching tube 90 into position 4.

If, however, the called line is busy, then the control grid of the busy test gate 128 is biased to cut-off so as to block the call at this point. The application of this busy potential is effected as follows:

Whenever a line is busy, the positive pulses 9 appearing in the output of clipper tube 8 will be applied also to the control grid of a busy test tube 131. A positive pulse 132 will, therefore, be fed over conductor 133 to the suppressor grid of the busy test tube 134. This tube compares the timing of pulse 132 with that of pulses 135 applied to its control grid over conductor 136 which again represents the time position of the called line. If these two signals coincide, tube 134 becomes conductive and passes a negative pulse 137, which is applied to the control grid of tube 138 forming, with tube 139, a flip-flop circuit of a step pulse generator. 138 is normally conducting and will be driven to cut-off by the integrated pulses reaching its control grid, whereupon the tube 139 will become conductive and drive the control grid of the busy test gate 128 to cut-off and thus block the call.

If the line is idle, then 138 remains conductive and the control grid of 128 remains at or near zero potential permitting the passage of pulse 129 as previously described.

When the switching tube 90 is in position 4, a potential is applied over conductor 140 to the suppressor grids of ringing gate tubes 141 and 142 in parallel, causing these tubes to become positively biased. A ringing oscillator 143 will modulate the output of the gate 141, and the ringing signal thus produced is passed over conductor 144 to the control grid of the output gate 43. When the output gate control tube 40 applies a positive pulse to the suppressor grid of the output gate 43, the latter becomes conductive and the ringing signal is passed through an amplifier 145 and a conductor 146 to control grid 147 of the distributor tube 3, and through the beam thereof onto the calling line to operate the ringer or any other calling device provided at the called station.

When the called subscriber answers, pulses are generated in tube 6, 8 and 10 in the above described manner. The pulse 9 is applied to the control grid of a cathode follower 148 and thence over conductor 149 to the suppressor grid of tube 150. The pulses 9 through tubes 131 and 134 cause 139 to become conductive in the above described manner. A positive pulse is now applied from the plate of 138 to the control grid of trip ringing tube 142 which will, therefore, apply the positive pulse 129 to the control grid of the inverter 130. The transfer pulse generator 101, 102 is now operated to advance the switching tube 90 into position 5.

Two-way talking signals are now passed over the distributors 2 and 3, the input and output gates 41 and 44, and low pass filters 151 and 152, and the amplifier 145.

Pulses 135 applied over conductor 136 and a busy pulse shaper 153 will positively bias the suppressor grid of 131 and the control grid of a triode 154. Negative pulses 155 applied by 154 to conductor 11 will balance out the positive pulses 13 that are produced when the called party answers and thus prevent the starting of another line finder.

Upon the termination of the conversation, when the parties hang up, the delayed gain tube 29 and the release tube 37 restore to normal with the former conducting. A negative pulse 156 generated in the output circuit of release tube 37 is applied over conductor 157 in multiple to the grids of release tubes 158, 159 and 160 associated, respectively, with the beam switching tubes 90, 91 and 92. The cathodes of these release tubes are connected with the deflecting plates 76*a*, *b*, *c* and cause the restoration of the switching beams to normal.

What I claim is:

1. An electronic switching arrangement comprising; an electron beam source, a plurality of electrodes on which the beam may impinge, deflecting means for moving the beam with respect to said electrodes from a predetermined normal position, a screen in the path of the beam and having portions through which the beam may impinge on the electrodes, a condenser connected with said screen and to said deflecting means, means for charging said condenser with a charge of a predetermined polarity only, means connected to said condenser and including said screen for maintaining a charge on said condenser, both of said last-mentioned means forming part of means for supplying predetermined charges to the deflecting means to move the beam to impinge through a screen opening onto a predetermined electrode.

2. The device according to claim 1, further comprising a normally open circuit including said condenser and circuit closing means, connected to the screen and deflecting means, for releasing the charge from the condenser through said circuit to return the beam to its normal position.

3. An electronic switching arrangement according to claim 1, further comprising an anode adjacent the path of the beam and positioned between the screen and said electrodes.

4. An electronic switching system comprising the device according to claim 3, and a multi-electrode discharge device having a grid connected with said anode.

5. An electronic switching arrangement comprising; a first and a second device, each device having an electron beam source, a plurality of electrodes on which the beam may impinge and deflecting means for moving the beam from one electrode to the next, two cathode ray tubes, one for each device, electrodes for each cathode ray tube having multiple connections with the electrodes of the associated device, and means for moving the beam of each cathode ray tube successively into engagement with its electrodes at a rate of speed having a predetermined relationship to the rate at which the beam of the other cathode ray tube is moved.

6. The arrangement according to claim 5, and an anode for each device activated when the beam of the associated device is impinging on an electrode thereof and the beam of the cathode ray tube associated with the device engages the electrode connected with the last-mentioned electrode.

7. The arrangement according to claim 6, and a screen in each device having openings through which the beam may impinge on the electrodes thereof.

8. In an electronic switching system, a device having a plurality of electrodes and means for producing and moving a beam of electrons step-by-step over said electrodes, means for causing said beam to move a predetermined number of steps so as to stop on a predetermined one of said electrodes, means for holding said beam on the electrode on which it has stopped, a cathode ray tube having a plurality of electrodes, each connected to a different one of the electrodes of said device, means for causing the electron beam of said tube to sweep in sequence across said tube electrodes, and means in said device for producing a pulse when the beam of said tube sweeps across the tube electrode to which is connected the electrode of said device upon which the beam of said device has stopped.

9. In an electronic switching system, the combination according to claim 8, in which the means in the device for producing a pulse comprises an anode arranged to receive secondary electron emission from the electrodes of said device.

10. The arrangement, according to claim 5, in which the devices are included in a register controller and further comprising means operable in accordance with one digit of a number for setting the beam of one device and in accordance with the next digit for setting the beam of the second device.

11. The arrangement, according to claim 10, further comprising a rotary distributor in which telephone lines terminate, the rates of rotation of the beams of the cathode ray tubes bearing a predetermined relationship to the rate of rotation of said distributor.

12. In a telephone switching system a plurality of numerically designated lines, a pair of devices each having a plurality of electrodes and means for producing an electron beam, and means operable in accordance with the number of pulses for designating of a line for setting said beams onto predetermined electrodes and holding them thereon, a first and a second cathode ray tube, one having electrodes multipled with those of one device and the second electrodes multipled with those of the other, a rotary distributor in which said lines terminate means for rotating the beam of the first tube in one relationship and the beam of the second tube in another relationship to the rotation of the beam of the distributor, and means responsive when the beams of each cathode ray tube and the device associated therewith are on electrodes multipled together for completing a connection to the line designated by said pulses.

13. In a tele-communication system, a plurality of lines divided into groups, a first cathode ray tube having groups of electrodes in which said lines terminate, each line in a separate electrode, and means for continuously moving the beam over said electrodes at a certain speed, a low pass filter having an input and an output, means controlled by said first cathode ray tube for connecting a calling line to the input of said filter each time the beam of said first cathode ray tube falls upon the electrode of the calling line, a second cathode ray tube having one electrode for each group of lines and means for continuously moving its beam to contact one electrode while the beam of the first tube sweeps over the corresponding group, a third cathode ray having an electrode for each in a group of the first tube and means for continuously moving its beam to traverse them all while the beam of the second tube engages one of its terminals, and means controlled by said second and third cathode ray tubes for establishing a connection between the output of said filter and a called line when the beam of said first tube engages the terminal thereof corresponding to the called line.

14. The system according to claim 13 in which the last mentioned means comprises a register having a fourth and a fifth cathode ray tube, electrodes for the fourth tube multipled with those of the second, electrodes for the fifth tube multipled with those of the third, and means controlled by the calling line for setting the beam of the fourth and fifth tubes on to terminals corresponding, respectively, to the group and individual line designation of the called line.

15. The system according to claim 13, and an additional cathode ray tube having electrodes, and means controlled by the calling subscriber for setting the beam of the last mentioned tube on its electrodes in succession to control the successive setting of the fourth and fifth cathode ray tubes.

DAVID H. RANSOM.

REFERENCES CITED

The following references are of record in the file of this patent:

UNITED STATES PATENTS

| Number | Name | Date |
|---|---|---|
| 2,122,102 | Lundell | June 28, 1938 |
| 2,173,193 | Zworykin | Sept. 19, 1939 |
| 2,301,748 | Renshaw | Nov. 10, 1942 |
| 2,356,514 | Graham | Aug. 22, 1944 |
| 2,369,749 | Magy et al. | Feb. 20, 1945 |
| 2,379,221 | Espenschied | June 26, 1945 |
| 2,401,729 | Goldsmith | June 11, 1946 |
| 2,417,450 | Sears | Mar. 18, 1947 |
| 2,466,945 | Morton | Aug. 10, 1948 |